United States Patent Office 3,468,801
Patented Sept. 23, 1969

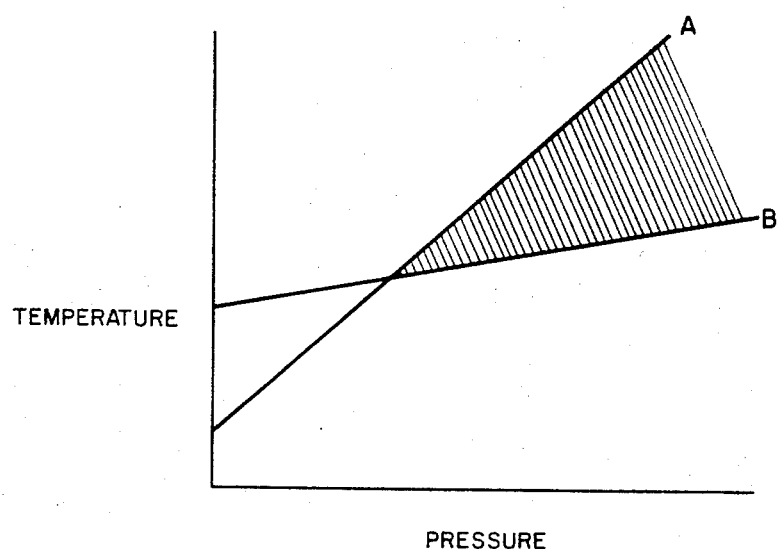
Wayne D. Wilson
Hubert B. Hall
INVENTORS

3,468,801
SYNTHESIS OF GARNET AT HIGH PRESSURES
Wayne D. Wilson, 2000 Wallace Ave., Silver Spring, Md. 20902, and Hubert B. Hall, 716 Somerset Place, Hyattsville, Md. 20783
Filed Jan. 21, 1966, Ser. No. 522,329
Int. Cl. B01j 17/36; C04b 35/26
U.S. Cl. 252—62.58                                23 Claims

ABSTRACT OF THE DISCLOSURE

A method for preparing garnet crystal of the formula $X_3Z_2(SiO_4)_3$, wherein X is $Mg^{+2}$, $Fe^{+2}$, $Mn^{+2}$, or $Ca^{+2}$ and Z is $Al^{+3}$, $Fe^{+3}$ or $Cr^{+3}$ is disclosed. This method includes the steps of melting and solidifying the constituent oxides of garnet in their proper proportions at temperatures and pressures at which the garnet is stable.

---

The invention described herein may be manufactured and used by or for the Government of the United States of America for governmental purposes without the payment of any royalties thereon or therefor.

This invention pertains to the formation of crystalline materials and more particularly to a method for producing garnet crystals.

There are several known methods for forming crystals and these include the Bridgeman technique wherein single crystals are grown from a melt and the Verneiul flame fusion process. These processes, however, are not suitable for growing large garnet crystals. Garnet crystals have been produced by chemical reactions at elevated temperatures and pressures but such methods are too slow and produce side products which interfere with crystal growth.

Accordingly, it is an object of this invention to provide a new method for producing garnet crystals.

It is another object to produce clear single garnet crystals in a short space of time.

It is a further object to produce single crystals of grossularite which may be used as laser and maser crystals.

These and many other objects may become more fully apparent from the following detailed description of the invention wherein; the figure is a schematic representation of the pressure dependency of the stability and melting temperature of garnet crystals.

The objects of this invention are accomplished by forming garnet crystals under pressure from either a non-crystalline substance having the stoichiometric formula of garnet (this term includes a poorly crystallized garnet) or the constituent oxides of garnet in their proper proportions, said constituents combining under the process conditions to form garnet crystals. The garnet family has the stoichiometric formula $X_3Z_2(SiO_4)_3$ wherein X is $Mg^{++}$, $Fe^{++}$, $Mn^{++}$, or $Ca^{++}$ and Z is $Al^{+++}$, $Fe^{+++}$, or $Cr^{+++}$ and includes, grossularite $[Ca_3Al_2(SiO_4)_3]$, pyrope $$[Mg_3Al_2(SiO_4)_3]$$

rhodolite $[2Mg_3Al_2(SiO_4)_3Fe_3Al_2(SiO_4)_3]$, almandite $$[Fe_3Al_2(SiO_4)_3]$$

spessartite $[Mn_3Al_2(SiO_4)_3]$, andradite $[Ca_3Fe_2(SiO_4)_3]$, and uvarovite $[Ca_3Cr_2(SiO_4)_3]$. Hereinafter the term "garnet" will be used to represent the starting material and it includes both a non-crystalline substance having the stoichiometric formula of garnet and a proper proportioned mixture of the constituent oxides of garnet, and the term "garnet crystal" will be used to represent the finished product.

It has been found that at temperatures above a particular temperature, called the dissociation temperature, garnet crystals dissociate and at normal pressures this temperature is below the melting point. Due to this dissociation, attempts to produce garnet crystals from a melt at normal pressures have not been successful. The dissociation temperature and melting temperature of garnet are pressure dependent and this is schematically represented in the figure wherein A is the stability line and B is the melting line. It should be readily apparent from the graph that there is a certain pressure above which garnet can be melted without dissociating and thus, the shaded area represents temperatures and pressures at which garnet can be melted without dissociating.

Accordingly, the process of this invention involves forming garnet crystals by melting and solidifying garnet at a temperature and pressure at which garnet is stable. More particularly, garnet is subjected to any pressure that is high enough to prevent dissociation at the melting point and at this pressure it is heated to a temperature high enough to cause melting yet low enough to prevent dissociation. Once it is uniformly melted, a solidification may be effected, for example, by reducing the temperature, said reduction being performed rapidly or over a period of time, with a slower reduction in temperature generally being preferred. It is to be understood that temperatures and pressures may vary throughout the process so long as the melting and solidification is effected at conditions at which garnet is stable. Thus, for example, instead of keeping the pressure constant after the garnet has melted, the pressure may be either raised or lowered before reducing the temperature, with a raising of the pressure being utilized to effect solidification without an initial reduction in temperature.

The pressure dependency of the dissociation temperature and melting temperature varies with the particular garnet crystal to be produced and this relationship may be ascertained either from information currently available in the literature or by simple experimentation. The particular temperature and pressure at which optimum results are obtained will vary with the pressure system employed and the garnet to be produced, and these conditions may be readily determined by those skilled in the art.

The process of this invention may be effectively performed by any means which is capable of effecting melting and solidification under pressure. One such means is described in detail in application, Ser. No. 482,035, filed on Aug. 18, 1965 by W. D. Wilson and H. B. Hall, said application hereby being incorporated by reference. The utilization of this apparatus, due to the high temperatures employed introduces limitations as to the material employed as the capsule for the garnet. If the capsule material melts at the temperatures employed, it will diffuse through the garnet preventing formation of a single clear crystal and therefore the capsule must be made from a material that does not react with or diffuse into the garnet; i.e., it must be inert at high temperatures. It has been found that carbon in the form of graphite is an excellent capsule material at all pressures with carbon lined materials such as, carbon lined Vycor glass and carbon lined magnesium oxide giving equally good results. Tantalum and tungsten may also be utilized as capsule materials but they are not as effective since the melting and solidification must be performed rapidly in order to prevent diffusion. It is to be understood, however, that the above description of the capsule and the apparatus described in detail in application, Ser. No. 482,035 is not to be construed as limiting the invention in any manner since equally good results may be obtained with other pressure apparatus.

The starting material generally employed is a proper proportioned mixture of the oxides of the garnet crystal to be produced; i.e., a mixture of XO, $Z_2O_3$ and $SiO_2$ in a mole ratio of 3:1:3 respectively wherein X and Z are defined as above, said oxides uniting under the process conditions to form garnet crystals. Alternatively, the proper proportioned mixture of oxides can be fused at atmospheric pressure to form a non-crystalline substance having the stoichiometric formula of garnet and this substance may then be converted to garnet crystal by the process of this invention. The proper proportioned mixture of oxides can be formed either from the oxides individually; a combination of substances that contain the oxides in their proper proportions; e.g., a mixture of calcium aluminate ($3CaO \cdot Al_2O_3$) and silicon dioxide in a mole ratio of 1:3 respectively; the oxides in hydrated form; e.g., silicic acid ($SiO_2 \cdot 2H_2O$); or the like. If a hydrated form of oxide is used the small amount of water present acts as a flux which does not adversely affect the crystallization.

It is to be understood that many variations may be introduced into the above process without departing from the scope of the invention so long as the melting and solidification is performed at temperatures and pressures at which garnet does not dissociate. Thus the process of this invention may be varied to produce laser and maser crystals by forming grossularite crystals "doped" with an active element such as samarium or europium. The "doped" crystal may be produced by replacing a portion of the aluminum oxide utilized in the starting mixture with either samarium or europium oxide and then subjecting this mixture to the process conditions of this invention. Alternatively, an active element may be introduced into the crystal in a divalent state by replacing a portion of the aluminum oxide with aluminum and an active element oxide, said components reacting under the process conditions of the invention to produce aluminum oxide and a divalent active element oxide which reacts with the other starting materials to produce a "doped" grossularite crystal.

The process of this invention may also be varied to produce demantoid, which is a green variety of andradite. Thus, andradite may be produced from a proper proportioned mixture of calcium oxide, ferric oxide and silicon dioxide under the conditions of the process of this invention at temperatures below about 1800° C. while demantoid is produced from the same mixture under the process conditions of the invention at temperatures about 1800° C.

It is to be understood that the above alternatives are only illustrative of the various modifications that can be made without departing from the teachings of the invention and accordingly, numerous other variations should be readily apparent to those skilled in the art.

The following examples are illustrative of the invention but they are not to be construed as limiting the invention in any manner.

Example I

The apparatus employed in this and the following examples was the one described in application, Ser. No. 482,035, utilizing a 300 ton press.

Calcium oxide, aluminum oxide and silicon dioxide ($3CaO:Al_2O_3:3SiO_2$) were mixed and pressed into a graphite capsule. The capsule was placed in the high pressure apparatus and the pressure raised to about 15 kilobars. The mixture was heated at this pressure to about 1800° C. to melt the oxides, held there for about two or three minutes and then the temperature was slowly reduced to cause the melt to solidify. When the temperature was reduced to a value at which grossularite is stable, the pressure was released and the sample cooled to room temperature. The sample removed from the capsule was grossularite crystal.

Example II

Calcium oxide, aluminum oxide and silicic acid were mixed in the proper proportions (3 moles to 1 mole to 3 moles respectively) and packed into a carbon lined magnesium oxide capsule. The capsule was placed in the pressure apparatus and the pressure raised to about 15 kilobars. The mixture was heated at this pressure to about 1500° C. and under these conditions the silicic acid broke down into silicon dioxide and water. These conditions were maintained for about two minutes and then the temperature was slowly reduced to solidify the melt. After releasing the pressure and further cooling, the sample recovered was grossularite crystal.

Example III

Calcium oxide, aluminum and silicon dioxide were mixed in the proper proportions and presintered at atmospheric pressure and 2000° C. to cause the materials to fuse. The resulting product was pulverized to obtain a powder which was pressed into a tantalum capsule. The capsule was placed in the pressure apparatus and the pressure was increased to about 15 kilobars. The sample was heated at this pressure to about 1550° C. to melt the sample, held there for about two minutes and then the temperature was slowly reduced over a period of about two minutes to solidify the melt. After releasing the pressure and further cooling, the sample recovered was grossularite crystal.

Example IV

Calcium aluminate and silicon dioxide ($3CaAl_2O_4$: $3SiO_2$) were mixed and pressed into a graphite capsule. The capsule was placed in the pressure apparatus and the pressure was raised to about 15 kilobars. The mixture was heated at this pressure to about 1500° C. to melt the oxides, held there for about two minutes, and then the temperature was slowly reduced to cause the melt to solidify. After releasing the pressure and further cooling, the sample recovered was grossularite crystal.

Example V

A proper proportioned mixture of calcium oxide, aluminum oxide and silicon dioxide (3:1:3 moles respectively) in which about 1% of the aluminum oxide was replaced with samarium oxide was pressed into a carbon capsule. The capsule was placed in the pressure apparatus and the pressure raised to about 15 kilobars. The sample was heated at this pressure to about 1630° C. to melt it and then slowly cooled to solidify the melt. After releasing the pressure and further cooling, a grossularite crystal "doped" with samarium was recovered.

Example VI

Calcium oxide, ferric oxide and silicon dioxide ($3CaO:1Fe_2O_3:3SiO_2$) were mixed and pressed into a carbon capsule. The capsule was placed in the pressure apparatus and the pressure raised to about 7.5 kilobars. The sample was heated at this pressure to about 1725° C. to melt it, held there for about three minutes and then the temperature was slowly reduced to solidify the melt. After releasing the pressure and further cooling, an andradite crystal was recovered.

The process of this invention in which garnet is produced from its constituents is superior to other known techniques for obtaining garnet in that it does not produce undersirable side products which affect the size and quality of the garnet crystal. Since the garnet crystals produced by the process of this invention are indistinguishable from natural garnets they may be utilized in the same manner as natural garnet.

Obviously many modifications and variations of the present invention are possible in the light of the above teachings. It is therefore to be understood, that within the scope of the appended claims, the invention may be practiced otherwise than as specifically described.

What is claimed is:

1. A method for preparing garnet crystal of the formula $X_3Z_2(SiO_4)_3$, wherein X is $Mg^{+2}$, $Fe^{+2}$, $Mn^{+2}$, or $Ca^{+2}$ and Z is $Al^{+3}$, $Fe^{+3}$ or $Cr^{+3}$, which comprises melting a member selected from the group consisting of a noncrystalline substance having the stoichiometric formula of garnet, and a mixture consisting essentially of the constituent oxides of garnet in their proper proportions and solidifying said member, said melting and solidification being performed at a temperature and pressure at which the garnet is stable.

2. The method of claim 1 wherein said member is a mixture consisting essentially of the constituent oxides of garnet in their proper proportions.

3. The method of claim 1 wherein the garnet crystal is grossularite, and said member is a mixture consisting essentially of the constituent oxides of grossularite in their proper proportions.

4. The method of claim 3 wherein said member is a mixture consisting essentially of calcium oxide, aluminum oxide and silicon dioxide in a mole ratio of about 3:1:3 respectively.

5. The method of claim 3 wherein said member is a mixture consisting essentially of calcium aluminate and silicon dioxide in a mole ratio of about 1:3.

6. The method of claim 3 wherein said member is a mixture consisting essentially of calcium oxide, aluminum oxide and silicic acid in a mole ratio of about 3:1:3 respectively.

7. The method of claim 3 wherein the melting and solidification is performed at a pressure of about 15 kilobars.

8. The method of claim 7 wherein said member is melted and heated to a temperature of about 1500° C. before solidification.

9. The method of claim 4 wherein a portion of the aluminum oxide in the mixture is replaced with a doping amount of samarium oxide.

10. The method of claim 4 wherein a portion of the aluminum oxide in the mixture is replaced with a doping amount of europium oxide.

11. The method of claim 4 wherein a portion of the aluminum oxide is replaced with a doping amount of a mixture of aluminum and samarium oxide.

12. The method of claim 4 wherein a portion of the aluminum oxide is replaced with a doping amount of a mixture of aluminum and europium oxide.

13. The method of claim 2 wherein said member is a mixture consisting essentially of calcium oxide, ferric oxide and silicon dioxide in a mole ratio of about 3:1:3 respectively.

14. The method of claim 13 wherein the melting and solidification is performed at a pressure of about 7.5 kilobars.

15. The method of claim 14 wherein the member is melted and heated to a temperature of about 1725° C. and the garnet crystal produced is andradite.

16. The method of claim 14 wherein the member is melted and heated to a temperature above about 1800° C. and the garnet crystal produced is andradite in the demantoid form.

17. The method of claim 1 wherein the solidification is effected by raising the pressure.

18. The method of claim 1 wherein said member is a non-crystalline substance having the stoichiometric formula of garnet.

19. The method of claim 18 wherein said substance has the stoichiometric formula of grossularite.

20. The method of claim 18 wherein said substance has the stoichiometric formula of andradite.

21. A grossularite crystal, said grossularite crystal containing a doping amount of an element in the divalent state selected from the group consisting of europium and samarium.

22. The grossularite crystal of claim 21 wherein said element is samarium.

23. The grossularite crystal of claim 21 wherein the element is europium.

References Cited

UNITED STATES PATENTS 2,941,861   6/1960   Wentorf  ----------  106—42 X

TOBIAS E. LEVOW, Primary Examiner

J. COOPER, Assistant Examiner

U.S. Cl. X.R.

23—110, 304, 305; 106—42; 252—62.56, 62.59, 62.63, 62.64, 301.4